Figure 1:
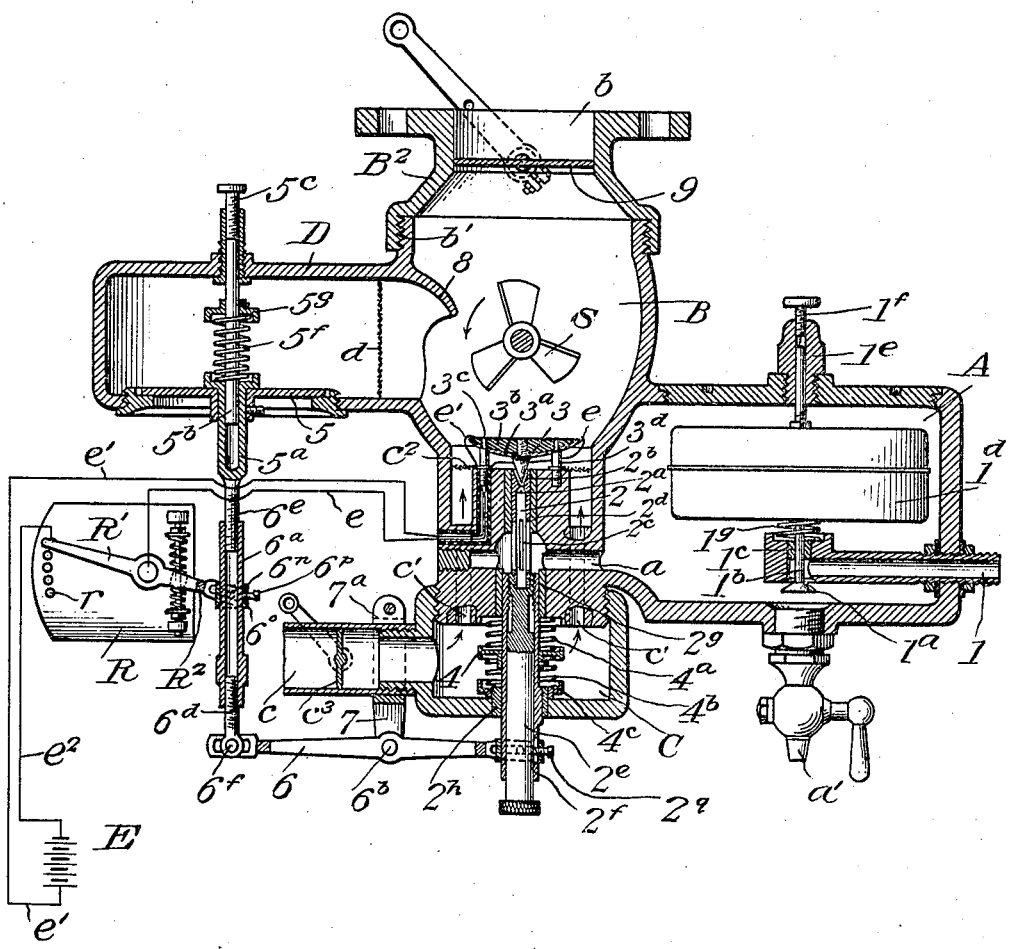

G. D. JORDAN.
CARBURETER.
APPLICATION FILED MAR. 15, 1913.

1,095,402.

Patented May 5, 1914.
2 SHEETS—SHEET 1.

WITNESSES:
Fenton S. Belt
Donald U. Rich

INVENTOR
George D. Jordan
BY
Arthur E. Dowell
ATTORNEY

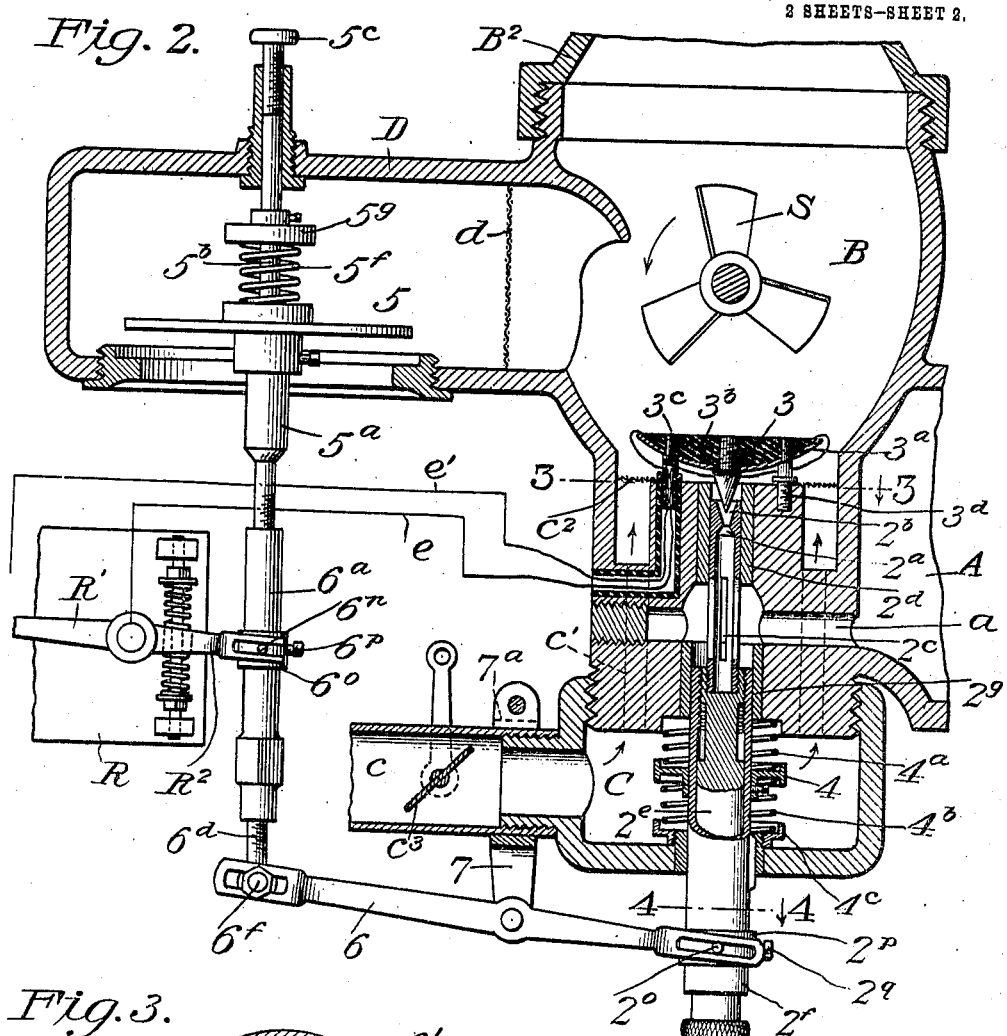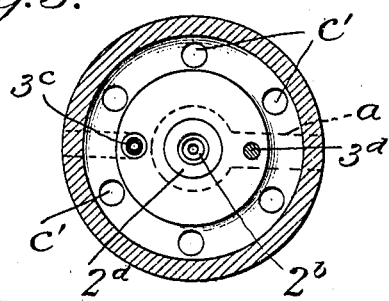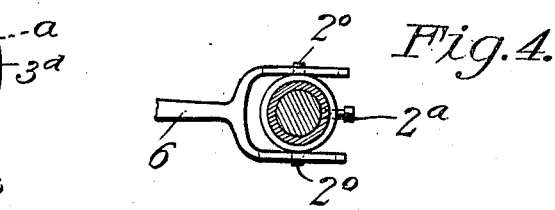

UNITED STATES PATENT OFFICE.

GEORGE D. JORDAN, OF BASIC CITY, VIRGINIA, ASSIGNOR, BY MESNE ASSIGNMENTS, OF SEVEN-FORTIETHS TO ASHER AYRES AND SEVEN TWENTY-FOURTHS TO GEORGE C. JORDAN, BOTH OF WASHINGTON, DISTRICT OF COLUMBIA, AND THIRTY ONE-HUNDREDTHS TO BROOK E. WATSON, OF WAYNESBORO, VIRGINIA.

CARBURETER.

1,095,402. Specification of Letters Patent. Patented May 5, 1914.

Application filed March 15, 1913. Serial No. 754,567.

*To all whom it may concern:*

Be it known that I, GEORGE D. JORDAN, of Basic City, in the county of Augusta and State of Virginia, have invented certain new and useful Improvements in Carbureters; and I hereby declare that the following is a full, clear, and exact description thereof, reference being had to the accompanying drawings, which form part of this specification.

This invention is a novel carbureter for use in connection with explosive engines, and more particularly designed for use with automobile engines.
In brief, the invention comprises a float chamber; a mixing chamber; an atomizing nozzle to which fluid is supplied from the float chamber and which discharges into the mixing chamber; an electrically heated baffle in the mixing chamber, in the path of the atomized fuel adapted to vaporize and disseminate the fuel into the air entering the mixing chamber; a supplemental air valve to admit air into the mixing chamber; a baffle in said chamber to direct the supplemental air toward the fuel heating plate and vaporizer; means controlled by the supplemental air valve for varying the admission of fuel into the mixing chamber in accordance with the amount of supplemental air supplied thereto; and means whereby the said supplemental air valve controls the electric current for heating the baffle.

By this invention the liquid hydrocarbon fuel can be converted into vapor and mixed with air in such proportions as will secure a maximum efficiency of the engine with a minimum waste; and will enable a cheaper grade of fuel to be employed, thereby further reducing the cost of operating such engines.

I will describe the invention in detail with reference to the accompanying drawings which show one practical embodiment thereof, but the invention should not be restricted to the specific construction and arrangement of parts illustrated; and the claims set forth the novel features of construction and combinations of parts for which protection is desired.

In said drawings: Figure 1 is a vertical sectional elevation through the complete carbureter. Fig. 2 is an enlarged detail sectional view showing the parts in position assumed when the supplemental air valve is open. Fig. 3 is a section on line 3—3, Fig. 2, looking in the direction of the arrow. Fig. 4 is a section on line 4—4, Fig. 2.

The liquid hydrocarbon fuel is admitted into a float chamber A through a pipe 1, connected to any suitable supply, which may be formed in the main casting or shell of the carbureter. The admission of fluid from the pipe 1 into the chamber A is controlled by a valve $1^a$ which opens downwardly; and the stem of this valve extends above the pipe 1 and is connected with a float $1^d$, of any suitable construction. The valve rod $1^b$ may extend through a bushing $1^c$ in the pipe 1, opposite the valve seat, and the upper end of said rod $1^b$ be guided in a bushing $1^e$ tapped into the cover of the float chamber, and the ascent of the float can be regulated by a tap screw $1^f$ in said bushing. A spring $1^g$ may be interposed between the float and the bushing $1^e$ to cushion the descent of the float and assist in steadying the float in the chamber. The chamber A has a drain cock $a'$ screwed to its bottom, of any suitable construction, said cock being located in alinement with the valve $1^a$; by removing the cock access can be had to the valve $1^a$ when necessary to repair it.

From chamber A the liquid fuel passes through a port $a$ to the atomizing nozzle or valve. This as shown, comprises a tube 2 having an internal contracted outlet port $2^a$ at its upper end through which the fuel is discharged into the mixing chamber B; and tube 2 has a conical valve seat $2^b$ in its upper end just above the port $2^a$; adapted to be closed by a conical or needle valve 3 which is fixed in the lower part of the mixing chamber B above the end of tube 2; said tube 2 is also provided with vertical slots $2^c$ which communicate with the port $a$.

Valve tube 2 is slidably fitted in a bushing $2^d$ secured within an annular bore in a part of the main casting beside float chamber A and beneath the mixing chamber B, and which connects the walls of said chambers. The valve tube 2 is connected at its lower end to a stem $2^e$ which is rotatably fitted in a sleeve $2^f$ that is slidably but not rotatably guided within a bushing $2^g$ in the part of the casing below the port $a$ and which extends through the air chamber C below the part and through a bushing $2^h$ in the bottom wall of chamber C in axial alinement with the tube 2. This air chamber C may be formed integral with the main casting but is preferably formed separately and screwed to the main part of the casing as indicated in the drawings.

Secured to the sleeve $2^f$ within the chamber C is an adjustable collar 4, and between this collar and the top of the chamber C is interposed a helical spring $4^a$; and between this collar 4 and the floor of the chamber C is interposed a spring $4^b$, which springs act to normally hold the valve tube 2 in its adjusted position; and to return it to such position if it is raised or lowered by external means. An adjustable collar $4^c$ may be screwed on the inner end of the bushing $2^h$ (see Fig. 2) at the bottom of chamber C to enable the tension of spring $4^b$ to be adjusted independently of spring $4^a$.

The stem $2^e$ has a threaded engagement with the valve tube 2 and, by rotating the stem, the valve tube 2 can be adjusted longitudinally in the sleeve $2^d$ so as to increase or diminish the amount of fuel normally admitted to the mixing chamber by regulating the normal adjustment or extent of separation of the needle valve 3 from its seat by adjusting the valve tube 2 toward or from the needle or conical valve 3.

The valve 3 is attached to a baffle and heating plate, which is located in the lower part of the mixing chamber B directly over the valve 2. This baffle and heating plate is constructed so as to be electrically heated. As shown it is composed of a concavo-convex plate $3^a$ of German silver, or other suitable metal or material, which will resist the passage of an electric current and be consequently heated, which may have a non-conducting filling $3^b$. An electric current can be transmitted to said plate by suitable electrical connections, conventionally indicated at $e$, $e'$. The conductor $e$ is preferably included in circuit with a rheostat R hereinafter referred to by which the amount of current supplied to this electrically heated baffle is regulated.

The baffle may be secured in position by means of screws or studs $3^c$, $3^d$, insulated therefrom and from the casing in any suitable manner.

Air is admitted into the air chamber C through a pipe $c$ shown as connected to one side thereof, and passes from chamber C through ports or passages $c'$ leading past the passage $a$, into the chamber B, the ports $c'$ being preferably arranged so as to admit air practically all around the heated baffle $3^b$ into the lower part of the mixing chamber B, as indicated in the drawings. The amount of air admitted through pipe $c$ is regulable by a valve $c^3$. The air entering chamber B from the port $c'$ may be disseminated by passing through screens $c^2$ as usual.

The air and fuel are, as usual, drawn into the mixing chamber B by suction from the engine; the explosive gases being withdrawn from the mixing chamber B through an outlet $b$ in the upper part thereof adapted to be connected in the usual manner to the ports or pipes leading to the explosion chambers of the engine, not shown. The port $b$ may be provided with a throttle valve 9 of any suitable construction.

In order to adapt the construction to different styles of engines I may make the part of chamber B containing the outlet $b$, detachable from the other parts and secure the same together in any suitable manner. Thus, as indicated in the drawings, the part $B^2$ containing the outlet $b$ is detachably attached to the main casting by a screw-threaded connection as shown at $b'$ in the drawings. By this means interchangeable parts $B^2$ of different sizes and forms adapted to fit various engines with which the carbureter could be used, may be provided; and the carbureter thus cheaply and quickly adapted to any engine by using a part $B^2$ of the proper form.

Communicating with the mixing chamber B is a supplemental air chamber D, that also communicates with the atmosphere; but communication between the atmosphere and said chamber D is normally closed by a suction-operated valve 5, which opens inwardly into said chamber, and is shown as having a hollow stem $5^a$ slidably engaged with a guide rod $5^b$ within the chamber D, which rod $5^b$ can be adjusted by means of a screw $5^c$. The valve 5 is normally held closed by a helical spring $5^f$ interposed between the inner side of the valve 5 and a collar $5^g$ on the rod $5^b$. When the suction of the engine through the chamber B draws air into this chamber D, the air lifts valve 5 and enters chamber B, being disseminated by a screen $d$, and strikes an inwardly projecting baffle plate 8 which deflects the supplemental air downwardly and directs it into the current of vapor entering from the valve 2 and disseminated by the baffle $3^a$.

The valve 5 is adapted to be operatively connected with the fuel valve tube 2 so that when the supplemental air valve is opened, an increased amount of fuel will be admitted into the mixing chamber. As shown stem $5^a$ may have a threaded connection with a tubular link $6^a$ as indicated at $6^e$, Fig. 1; and the lower end of link $6^a$ may have a threaded connection with a member $6^d$ which has a slidable pin and slot connection at one end to the lever 6, which is pivoted at $6^b$ on an arm or bracket 7 which may depend from a collar $7^a$ clamped on the pipe $c$; or lever 6 may be pivoted on any other convenient support. The other arm of lever 6 extends to the tube $2^f$ and preferably has a pin and slot engagement with lugs $2^o$ on a collar $2^p$ fastened to the lower end of the sleeve $2^f$, and secured by a bolt $2^q$ which is adapted to be passed through the sleeve $2^f$ and engage the stem $2^e$ so as to lock the latter in any position to which it may be shifted after adjusting the valve tube 2.

It will be seen that when the valve 5 opens in one direction the atomizing valve will also be opened, and the extent of opening of this valve by the valve 5 may be regulated by adjusting the pivot $6^b$ of the lever 6, by shifting the collar $7^a$ on the pipe c, or by adjusting the point of connection $6^f$ between the member $6^d$ and the lever 6 Fig. 2. The connections shown in the drawings are illustrative and not restrictive of the invention, and may be modified to suit the designer.

A rheostat R, of any suitable construction, is interposed in the circuit between an electrical supply, indicated at E in the drawings, and the baffle plate $3^a$; as shown one pole of the battery is connected by a wire $e'$ to one side of the baffle $3^a$ and the other pole of the battery is connected by a wire $e^2$ to the first contact point of the rheostat; and the wire e connects the switch member R' of the rheostat to the other end of the baffle plate, so that the current is from the battery through the rheostat to the baffle plate and return. The switch lever R' of the rheostat is adapted to contact with any one of the points r and thus cut more or less resistance in the circuit; the switch lever R' has an arm $R^2$ extending beside the tube $6^a$ which arm has a pin and slot connection indicated at $6^n$ with a collar $6^o$ which is adjustably secured on the tube or link $6^a$ by a bolt $6^p$ or other suitable means, so that the point of connection between the links $6^a$ and the rheostat lever R' can be varied and the rheostat lever can be set at any position desired, for normally closing the electrical circuit through the baffle plate. When the valve 5 raises it will be seen that the switch lever R' will be shifted and the amount of current transmitted to the baffle correspondingly varied.

Operation: The fluid hydrocarbon is admitted into the float chamber A by valve $1^a$ and is held at a given level therein by the float $1^d$. The fluid hydrocarbon is drawn through the atomizing valve 2, into the mixing chamber B by the suction of the engine, and is sprayed up against the heated baffle $3^a$ and thereby converted into vapor. A fixed amount of air is admitted through the pipe c into the chamber C and up through the ports $c'$ into the mixing chamber B, being disseminated by the screen $c^2$ as it enters the mixing chamber B, and combining with the vaporized fuel; the mixture being further agitated by a fan or stirrer S which is rotatably mounted in the chamber B and is rotated by the suction or blast therein and assists in the perfect admixture of the air and vapor. The supplementary air entering chamber B is deflected by the baffle 8 downward into the vapor and air entering the lower end thereof and commingled therewith by the stirrer S.

The opening of the supplementary air valve through the link $6^a$ operates the switch lever R' of the rheostat R, varying the current transmitted to the baffle $3^a$ and at the same time the link oscillates the lever 6, which in turn depresses the atomizing valve tube 2 and admits additional fuel to the chamber B, in proportion to the amount of supplemental air admitted thereto. The throttle $c^3$ in the pipe c regulates the amount of constant air supplied; and said throttle could be connected with the throttle 9 if desired, as usual.

By arranging the fuel valve under the inlet port there is less danger of such valve sticking and its release will be assisted by the suction of the engine.

The heated baffle will spread the vapor in such manner as will cause it to more readily assimilate the air entering from the constant supply, and also with the supplementary air; and the baffle 8 directs the supplementary air into the entering vapor and insures its thorough mixture therewith.

The fuel atomizing device is so designed that after adjusting it for admitting a fixed amount of fluid, it will respond to all the demands made by the motor, when running at high speed, and automatically deliver more fuel in proportion to the amount of supplementary air admitted.

What I claim is:—

1. In a carbureter, the combination of a mixing chamber, an electrical heater therein, means for admitting fuel into said chamber—a supplemental air inlet to said chamber, a supplemental air valve controlling said inlet, and means controlled by the supplemental air valve for varying the current supplied to said heater.

2. In a carbureter, the combination of a mixing chamber, an electrically heated baffle therein, means for admitting fuel into said chamber and against said baffle, a supplemental air inlet to said chamber; a supplemental air valve controlling said inlet, and means controlled by the supplemental air valve for varying the current supplied to said baffle.

3. In a carbureter, the combination of a mixing chamber, an electrical heater therein, a valve for admitting fuel into said chamber, means for admitting a normal air supply to said chamber, a supplementary air port for said chamber, and a supplementary air valve controlling said port, with a rheostat in electrical circuit with said heater, and means operated by said air valve for shifting said rheostat to vary the current supplied to the heater.

4. In a carbureter, the combination of a mixing chamber, an electrical heater therein, means for admitting fuel into said chamber, a supplemental air inlet to said chamber, a supplemental air valve controlling said inlet, means controlled by the supplemental air valve for varying the current supplied to said baffle heater; and means operated by said supplemental air valve for varying the amount of fuel admitted into said mixing chamber.

5. In a carbureter, the combination of a mixing chamber, an electrically heated baffle plate therein, a valve for admitting fuel into said chamber and against said baffle plate, means for admitting a normal air supply to said chamber, a supplementary air port to said chamber, and a supplementary air valve controlling said port, with means controlled by said supplementary air valve for varying the electric current supplied to said baffle plate; and means operated by said supplemental air valve for varying the amount of fuel admitted into said mixing chamber.

6. In a carbureter, the combination of a float chamber, a mixing chamber, a supplemental air chamber communicating with the mixing chamber, a valve for admitting fuel from the float chamber into the mixing chamber, an electrical heater in said mixing chamber, means for regulating the normal amount of fuel and air admitted into the mixing chamber, and a valve in the supplemental air chamber, with means whereby the amount of current transmitted to the heater is controlled by the supplemental air valve.

7. In a carbureter, the combination of a float chamber, a mixing chamber, and a supplemental air chamber communicating with the mixing chamber; a valve for admitting fuel from the float chamber into the mixing chamber; an electrically heated baffle in said chamber against which the fluid is discharged into the mixing chamber, and means for regulating the normal amount of fuel and air admitted into the mixing chamber; with a valve in the supplemental air chamber, a rheostat in electrical circuit with said baffle and connections between the supplemental air valve and said rheostat—whereby the amount of current transmitted to the baffle is controlled by the supplemental air valve.

8. In a carbureter, the combination of a float chamber, a mixing chamber, and a supplemental air chamber communicating with the mixing chamber, a valve for admitting fuel from the float chamber into the mixing chamber, an electrical heater in said mixing chamber, and means for regulating the normal amount of fuel and air admitted into the mixing chamber, with a valve in the supplemental air chamber, means whereby the amount of current transmitted to the heater is varied by the movement of the supplemental air valve; and connections between said supplemental valve and the fluid supply valve whereby the amount of fluid admitted into the mixing chamber is varied by the supplemental air valve.

9. In a carbureter, the combination of a float chamber, a mixing chamber, a supplemental air chamber communicating with the mixing chamber, a valve for admitting fuel from the float chamber into the mixing chamber, an electrically heated baffle in said chamber adjacent said port, and means for regulating the normal amount of fuel and air admitted into the mixing chamber, with a valve in the supplemental air chamber, a rheostat in electrical circuit with said baffle and connections between the supplemental air valve and said rheostat whereby the amount of current transmitted to the baffle is varied by the movement of the supplemental air valve; and connections between said supplemental valve and the fluid supply valve whereby the amount of fluid admitted into the mixing chamber is varied by the supplemental air valve.

10. In a carbureter, the combination of a mixing chamber, a heated plate therein, means for admitting fuel against said plate, a supplemental air chamber communicating with the mixing chamber, and a baffle in the mixing chamber adapted to direct the supplemental air against the said plate substantially as described.

11. In a carbureter, the combination of a mixing chamber, a heated plate in the lower part thereof, means for admitting atomizing fuel into the lower part of said chamber and against said plate, a supplemental air chamber communicating with the mixing chamber, and a baffle in the mixing chamber adapted to direct the supplemental air downwardly against the hot plate, and a rotatable stirrer in said chamber substantially as described.

12. In a carbureter, the combination of a mixing chamber, a valve for admitting fuel into said mixing chamber, said valve comprising a tube having an outlet in its end, and a member within the mixing chamber adapted to close said tube; a stem for adjusting said tube longitudinally toward or from said member to regulate the normal supply of fuel to the mixing chamber, and means for quickly separating said tube and member independently of the stem to admit an increased supply of fuel to the mixing chamber.

13. In a carbureter, the combination of a mixing chamber, a fluid chamber, and a valve for admitting fuel into said mixing chamber, comprising a tube having a contracted outlet and a fixed member within the mixing chamber adapted to close said outlet; a stem for adjusting said tube longitudinally toward or from said member to regulate the normal supply of fuel to the mixing chamber, a sleeve surrounding said stem, and means for longitudinally moving said stem and tube to admit an increased supply of fuel to the mixing chamber.

14. In a carbureter, the combination of a mixing chamber, a fluid chamber, a valve for admitting fuel into said mixing chamber, said valve comprising a tube having a conical seat in its end, and a member within the mixing chamber adapted to close said tube, a stem for adjusting said tube longitudinally toward or from said member to regulate the normal supply of fuel to the mixing chamber, and a sleeve surrounding said stem; with a supplemental air port communicating with the mixing chamber, a supplemental air valve in said port, and connections between said supplemental air valve and said tube whereby the supply of fuel to the mixing chamber is increased when the supplemental air valve is opened.

15. In a carbureter, the combination of a mixing chamber, a fluid chamber, a valve for admitting fuel into said mixing chamber, said valve comprising a tube having a contracted outlet and a conical seat in its end, a fixed member within the mixing chamber adapted to close said outlet; a stem for adjusting said tube longitudinally toward or from said valve to regulate the normal supply of fuel to the mixing chamber, and a sleeve surrounding said stem; with an auxiliary chamber communicating with the mixing chamber, a supplemental air valve in said auxiliary chamber, and connections between said supplemental air valve and said tube whereby the latter is shifted to increase the supply of fuel to the mixing chamber when the supplemental air valve is opened.

16. In a carbureter, the combination of a mixing chamber, a fluid chamber, a valve for admitting fuel into said mixing chamber, said valve comprising a tube having an outlet in its end and a member within the mixing chamber adapted to close said tube, a stem for adjusting said tube longitudinally toward or from said valve to regulate the normal supply of fuel to the mixing chamber, and a sleeve surrounding said stem, with a supplemental air valve—connections whereby said supplemental air valve longitudinally moves said sleeve to admit an increased supply of fuel to the mixing chamber an electric heater in said mixing chamber and means whereby, when the supplemental valve is opened, the current to said heater is varied, substantially as described.

17. In a carbureter, the combination of a mixing chamber, a fuel supply, an atomizing valve comprising a tube interposed between the supply and the mixing chamber, said tube having a conical valve seat in its upper end, a valve fixed in the mixing chamber for closing said tube, a stem connected with said tube, a sleeve surrounding said stem having a threaded connection therewith whereby the tube may be adjusted, an air chamber through which said stem and sleeve pass, and means for conducting air from said chamber into the mixing chamber exterior to said sleeve.

18. In a carbureter, the combination of a mixing chamber, a fuel supply, an atomizing valve comprising a tube interposed between the supply and the mixing chamber, said tube having a conical valve seat in its upper end, a valve fixed in the mixing chamber for closing said tube, a stem connected with said tube, a sleeve surrounding said stem having a threaded connection therewith whereby the tube may be adjusted, an air chamber through which said stem and sleeve pass, and means for conducting air from said chamber into the mixing chamber; a heater in said mixing chamber, an electrical circuit for including said heater, a circuit controlling device, a supplemental air port communicating with said mixing chamber, a supplemental air valve and means whereby, when the supplemental air valve is opened, the current is varied, substantially as described.

In testimony that I claim the foregoing as my own, I affix my signature in presence of two witnesses.

GEORGE D. JORDAN.

Witnesses:
SAML. H. HALL,
THOS. C. MENEFEE.